United States Patent [19]
Tomita

[11] Patent Number: 6,061,215
[45] Date of Patent: May 9, 2000

[54] DISC RECORDING MEDIUM WITH CHECK INSERTION HOLE EXTENDING ACROSS INNER AND OUTER RIM PORTIONS OF THE HUB

[75] Inventor: Yasushi Tomita, Kanagawa, Japan

[73] Assignee: Sony Corporation, Tokyo, Japan

[21] Appl. No.: 09/124,047

[22] Filed: Jul. 29, 1998

[30] Foreign Application Priority Data

Jul. 31, 1997 [JP] Japan .................................... 9-206984
Mar. 18, 1998 [JP] Japan ................................. 10-068805

[51] Int. Cl.[7] .................................................. G11B 23/03
[52] U.S. Cl. ........................ 360/133; 360/99.05; 369/271
[58] Field of Search ............................. 360/99.04, 99.05, 360/133; 369/291

[56] References Cited

U.S. PATENT DOCUMENTS

| | | | |
|---|---|---|---|
| 4,989,107 | 1/1991 | Tsukahara | 360/99.08 |
| 5,450,260 | 9/1995 | Sakaguchi et al. | 360/99.08 |
| 5,476,700 | 12/1995 | Asai et al. | 428/66.6 |
| 5,761,016 | 6/1998 | Watanabe | 360/133 |

FOREIGN PATENT DOCUMENTS

| | | | |
|---|---|---|---|
| 62-088189 | 4/1987 | Japan . | |
| 62-157380 | 7/1987 | Japan | 360/133 |
| 63-316383 | 12/1988 | Japan . | |
| 03280279 | 12/1991 | Japan . | |

*Primary Examiner*—Jefferson Evans
*Attorney, Agent, or Firm*—Jay H. Maioli

[57] ABSTRACT

A signal recording medium capable of being strongly secured to a rotation part such as a disc table even during high-speed rotation includes a floppy disc with a hub at its center portion and a disc substrate having a disc-shaped main portion with a circular opening operating as a mounting portion for the hub. The disc substrate has also a signal recording surface on the disc-shaped main portion. The hub includes an abutment surface abutted against the disc table and rotated in unison with the floppy disc and a facing suction surface spaced apart from a suction magnet mounted on a rim portion of the disc table when the abutment surface is abutted against a hub setting surface of the disc table.

10 Claims, 14 Drawing Sheets

DISC RECORDING MEDIUM WITH CHECK INSERTION HOLE EXTENDING ACROSS INNER AND OUTER RIM PORTIONS OF THE HUB

BACKGROUND OF THE INVENTION

1. Field of the Invention

This invention relates to a recording medium for recording information signals and a disc cartridge holding the recording medium therein.

2. Description of Related Art

Up to now, a recording medium for recording information signals on the major surface of a flexible disc substrate which is the signal recording surface, has been in use.

A magnetic disc employing a flexible disc substrate, with a diameter of 3.5 inch has been in use. This magnetic disc has a center hub for chucking the magnetic disc on a disc drive device. The magnetic disc, so far used extensively, has a recording capacity of 2 megabyte (MB).

A magnetic disc 200, currently in widespread use, has a flexible disc substrate 201 of synthetic resin, and has the major surface of the disc substrate as the signal recording surface, as shown in FIGS. 1 and 2. At the center of the disc substrate 201 is formed a circular center aperture 201a and a hub 202 is mounted for closing this center aperture 201a.

The hub 202 is formed of a magnetic material, such as iron, and is mounted on the disc substrate 201 by having its tubular protruding portion 202a fitted in the center aperture 201a and by having its flange portion 202d on the outer rim of the protruding portion secured by adhesion to the rim of the center aperture 201a. In the center of the hub 202 is formed a rectangular spindle passage opening 202b passed through by a spindle 221 provided on the disc drive device side. At an offset portion from the center portion is formed a rectangular chuck pin engagement opening 202c engaged by a chuck pin 223 provided on the disc drive device.

The distal end face of the protruding portion 202a of the hub 202, formed with the spindle passage opening 202b and the chuck pin engagement opening 202c, operates as a setting surface 202e on a disc supporting surface 222a of a disc table 222 provided on the driving device. The outer rim portion of the setting surface 202e operates as a suction portion by a magnet 224 provided on the outer rim of the disc supporting surface 222a.

The magnetic disc 200, constructed as described above, is rotated in unison with the disc table by having its hub 202 chucked and centered with respect to a disc table of a disc rotation unit 220 provided on the disc drive device side. The information signals are recorded and/or reproduced by actuating the magnetic disc 200 by the magnetic head.

The disc rotation unit 220, provided on the disc drive device side, loaded with the magnetic disc 200, has the disc table 222 mounted as-one on the distal end of the spindle 221 run in rotation by a spindle motor, not shown. The upper side of the disc table 222, carried at the distal end of the spindle 221, operates as the disc supporting surface 222a on which to set the hub 202 of the magnetic disc 200. A chuck pin 223 is mounted at a position on the disc table 222 offset from the spindle 221. The chuck pin 223 is mounted for movement in a direction emerging from and sinking into the disc supporting surface 222a and in a direction towards and away from the spindle 221. The chuck pin 223 is biased in a direction away from the spindle 221 by biasing means, not shown.

On the disc table 222 is mounted a magnet 224, formed as, for example, a annular rubber magnet, for surrounding the disc supporting surface 222a. The magnet 224 is mounted on the disc table 222 so as to be at a lower level than the disc supporting surface 222a of the magnetic disc 200 on which to set the hub 202. There is maintained a pre-set separation $H_0$ between the magnet and the setting surface 202e of the hub 202 on the disc supporting surface 222a, as shown in FIG. 4.

The magnetic disc 200 is chucked on the disc table 222 by introducing the the spindle 221 through the spindle passage opening 202b, engaging the chuck pin 223 in the chuck pin engagement opening 202c, and by setting the setting surface 202e on the disc supporting surface 222a of the disc table 222, the hub 202 being then sucked by the hub 202, as shown in FIG. 4.

The state in which the magnetic disc 200 is mounted on the disc table 222 is explained.

In an initial state when the magnetic disc 200 is set on the disc table 222, the spindle 221 is passed through the spindle passage opening 202b and the chuck in 223 is engaged in the chuck pin engagement opening 202c, the spindle 221 and the chuck pin 223 usually are inserted into or engaged in the spindle passage opening 202b and in the chuck pin engagement opening 202c, without being thrust by the internal surfaces of these openings. At this time, the center-to-center separation F between the spindle 221 and the chuck pin 223 is the separation in an initial state in which the chuck pin 223 is not moved towards the outer rim of the magnetic disc 200.

The spindle passage opening 202b has the shape of a rectangle having a side of a length D and rounded at four corners. The spindle 221, introduced into the spindle passage opening 202b, has the shape of a column having diameter $\phi E$ shorter than the length D of a side of the spindle passage opening 202b. The chuck pin engagement opening 202c has the shape of a rectangle having the lengths of long and short sides equal to A and B, respectively, and having arcuately-shaped corners, as shown in FIG. 5. The chuck pin 223, engaged in the chuck pin engagement opening 202c, has the shape of a column having a diameter $\phi C$ shorter than the length B of the short side of the chuck pin engagement opening 202c.

If, from the state shown in FIG. 5 in which the magnetic disc 200 is set on the disc table 222, with the spindle 221 passed through the spindle passage opening 202b and the chuck pin 223 engaged in the chuck pin engagement opening 202c, the disc table 222 is run in rotation in the direction indicated by arrow R in FIG. 5, the chuck pin 223 compresses against the outer corner of the chuck pin engagement opening 202c towards the rotating direction of the disc table 222 to move the magnetic disc 200 towards the outer rim of the spindle 221, as shown in FIG. 6. By the magnetic disc 200 bing moved towards the rim by the chuck pin 223, the spindle 221 compresses against the corner of the spindle passage opening 202b remotest from the corner of the chuck pin engagement opening 202c engaged by the chuck pin 223, as shown in FIG. 6, thus centering the hub 202 of the magnetic disc 200 with respect to the disc table 222.

When the hub 202 of the magnetic disc 200 is centered on the disc table 22, there is produced difference between the rotational speed of the disc table 222 and that of the magnetic disc 200. That is, the disc table 222 is rotated n advance of the magnetic disc, such that the chuck pin 221 compresses against the outer corner of the chuck pin engagement opening 202c disposed towards the rotational direction of the disc table 222. By the chuck pin 221 compressing against the chuck pin engagement opening 202c, the magnetic disc 200 is moved from the center towards the outer rim of the spindle 221, under the bias of the chuck pin 221 biased in the direction of the outer rim of the disc table 222, the spindle 221 compressing against the corner of the spindle passage opening 202b for centering the hub 202 with respect to the disc table 222. At this time, the chuck pin 221 is moved towards the inner rim of the hub 202 to reduce the center-to-center distance G between the spindle 221 and the chuck pin 223 to a value smaller than the initial state distance F shown in FIG. 5.

The magnetic disc 200 is sucked by a magnet 224 on the disc table 222 for centering. In this state, the magnetic disc 200 is rotated in unison with the disc table 222. The signal recording surface of this magnetic disc 200 is scanned by a magnetic head for recording and/or reproducing information signals.

The magnetic disc 200 is constructed as disc cartridge housed in a main cartridge body unit. The magnetic disc 200 is loaded in this state on the disc drive device and chucked y the disc table 222 for centering with respect to the disc table 222.

The tracking, which is the positioning of the magnetic head with respect to each recording track formed circumferentially on the signal recording surface of the magnetic disc 200, is achieved by radially moving the magnetic head by a stepping motor along the radius of the magnetic disc 200. The amount of feed of the magnetic head along the radius corresponding to each step of the stepping motor is the track pitch.

Meanwhile, it is the rotational torque balance between the magnetic disc 200 and the disc table 222, produced on rotation of the disc table 222, that determines whether or not the magnetic disc has been centered on the disc table 222.

That is, it is determined by the balance between the rotational torque (r) and the torque T(h+s) which is the sum of the torque T(h) produced by contact between the magnetic head and the magnetic disc 200 and the torque T(s) produced by contact with the magnetic disc 200 of a protective sheet, such as a non-woven fabric, used for protecting the signal recording surface of the magnetic disc 200 provided in the main cartridge body unit holding the magnetic disc 200. The rotational torque (r) is the torque with which the disc table 222 and the magnetic disc 200 attempt to rotate in unison by the contacting portions of the disc table 222 and the magnetic disc 200 produced by suction of the magnetic disc 200 by the magnet 224 on the disc table 222 on setting the magnetic disc 200 on the disc table 222 to run the disc table 222 in rotation.

That is, if the level ratio of the rotational torque T(h+s) relative to the torque T(r) is smaller than an optimum value, the magnetic disc is not centered with respect to the disc table 222, but is rotated in the state shown in FIG. 5.

The magnetic disc having the diameter of 3.5 inch, now in wide use, has the recording capacity of 2.5 MB. For processing the program software or data of large capacity, there has been raised a demand for a magnetic disc having a higher recording capacity.

On the other hand, a magnetic disc with a diameter of 3.5 inch, now in extensive use as a recording medium for an information processing device, such as a computer, is desirably used with interchangeability with a disc drive device having a magnetic disc of a larger capacity as a recording medium.

Moreover, the magnetic disc with a diameter of 3.5 inch, so far used, is rotated at a 300 rpm for recording and/or reproducing information signals, and hence has a drawback that it is low in the data transfer rate.

SUMMARY OF THE INVENTION

It is therefore an object of the present invention to provide a disc-shaped recording medium that can be used interchangeably with the conventional disc-shaped recording medium on a common disc drive device to constitute a disc drive device having a high data transfer rate. It is another object of the present invention to provide a disc cartridge housing this disc-shaped recording medium.

In one aspect, the present invention provides a disc-shaped recording medium including a disc substrate having its major surface as a recording surface and provided with an approximately circular center opening, and a hub secured to the disc substrate for stopping the center opening of the disc substrate. The hub includes an inner rim portion having a center spindle opening in which is fitted a spindle of a driving device. The hub also includes an outer rim portion formed for being protruded from the inner rim portion via a step towards the side of insertion of the spindle.

The tracking servo information is recorded on the recording surface of the disc substrate. The hub is formed of a magnetic material.

In another aspect, the present invention provides a disc cartridge having a main cartridge body unit including a pair of halves in one of which is formed a spindle opening into which is inserted a spindle of a driving device, and a disc-shaped recording medium rotatably housed within the main cartridge body unit.

The disc-shaped recording medium includes a disc substrate having its major surface as a recording surface and provided with an approximately circular center opening and a hub secured to the disc substrate for stopping the center opening of the disc substrate. The hub includes an inner rim portion having a center spindle opening in which is fitted a spindle of a driving device, and an outer rim portion formed for being protruded from the inner rim portion via a step towards the side of insertion of the spindle.

With the disc-shaped recording medium according to the present invention and the disc cartridge holding the recording medium therein, the hub mounted centrally of a disc substrate of the disc-shaped recording medium has an inner rim portion having a center spindle opening in which is fitted a spindle of a driving device, the hub also including an outer rim portion formed for being protruded from the inner rim portion via a step towards the side of insertion of the spindle. Therefore, when the disc-shaped recording medium or the disc cartridge is loaded on the disc rotation unit of the disc drive device, the outer rim portion of the hub can be approached by the magnet provided on the disc rotation unit, so that the disc-shaped recording medium or the disc cartridge can be loaded with a larger suction force on the disc rotation unit to enable the disc-shaped recording medium or the disc cartridge to be unified reliably with the disc rotation unit.

Moreover, since the disc-shaped recording medium or the disc cartridge can be loaded on the disc drive device on which is loaded the conventional magnetic disc, the disc drive device employing the disc-shaped recording medium according to the present invention can be configured for employing the conventional magnetic disc.

DESCRIPTION OF THE PREFERRED EMBODIMENT

A disc-shaped recording medium and a disc cartridge housing this disc-shaped recording medium according to the present invention will be hereinafter explained.

In the following description, the present invention is applied to a magnetic disc having a flexible disc substrate.

Before proceeding to the description of the magnetic disc according to the present invention, a disc drive device 150 employing a magnetic disc according to the present invention is explained.

This disc drive device is configured for enabling recording and/or reproduction of information signals for both a conventional magnetic disc having the recording capacity of 2 MB and a magnetic disc of the present invention.

Figure 7:
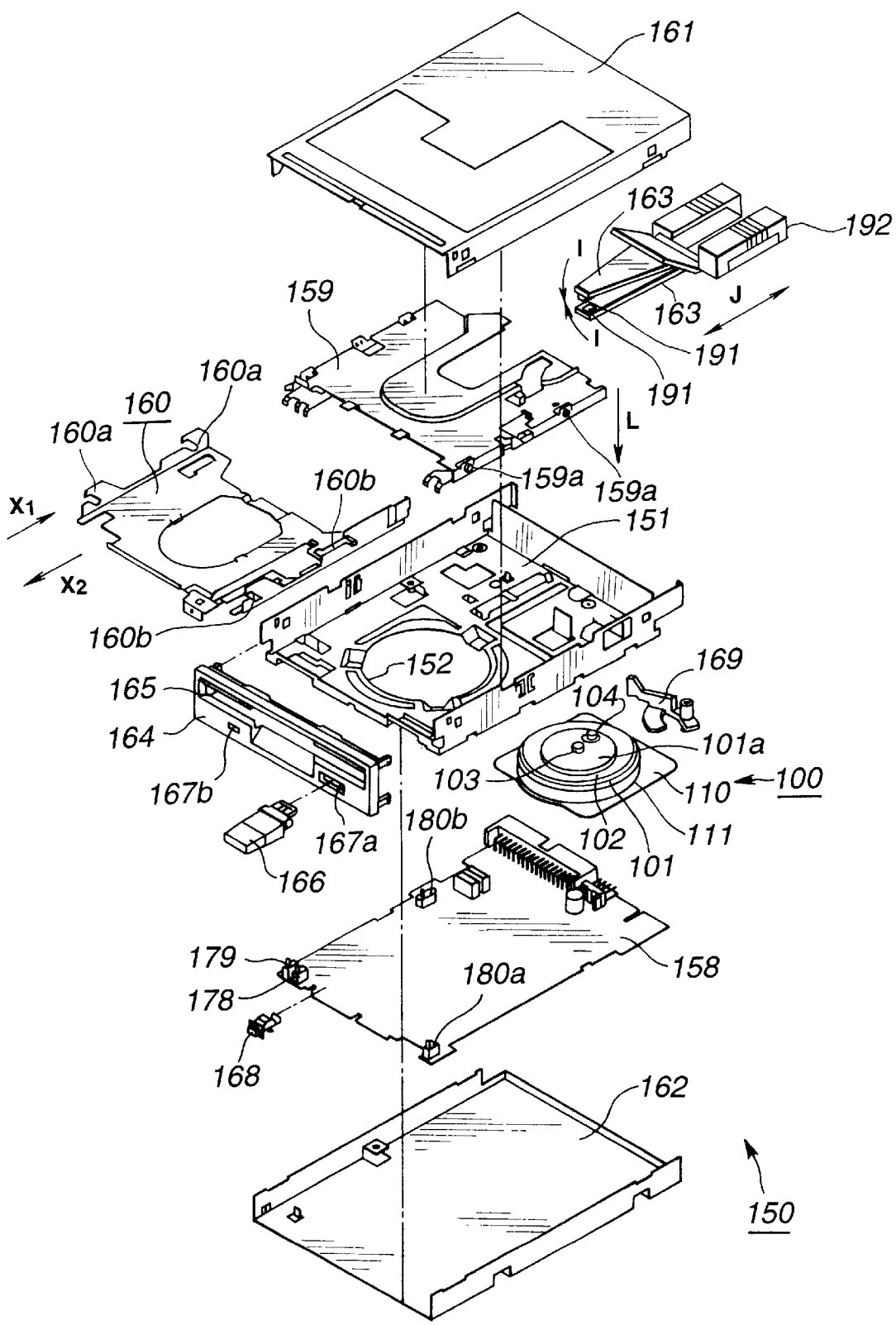
FIG. 7 is an exploded perspective view showing a disc drive device on which is loaded a disc cartridge of the present invention housing the magnetic disc according to the present invention.

Referring to FIG. 7, the disc drive device 150 includes a base 151 substantially in the form of a flat plate and a disc rotation unit 100 at a mid portion of the base 151 for rotationally driving the magnetic disc. This disc rotation unit 100 includes a spindle motor 111 and a disc table 101 mounted as-one on the distal end of a spindle 103 operating as a driving shaft of the spindle motor 111. The disc rotation unit 100 is mounted on the base 151 by having the spindle motor 111 in an opening 152 formed at a mid portion of the base 151 so that the spindle 103 is protruded towards the upper surface of the base 151 and by securing a stator substrate 110 constituting the spindle motor 111 to the lower surface of the base 151.

The upper surface of the disc table 101, mounted on the distal end of the spindle 103 for rotation in unison with the spindle 103, has a disc supporting surface 101a on its upper surface for setting the hub of the magnetic disc thereon. The disc table 101 includes a chuck pin 104 at a position offset from the spindle 103. The chuck pin 104 is mounted for movement in a direction emerging from and sinking into the disc supporting surface 101a and in a direction towards and away from the spindle 103. The chuck pin 104 is biased by biasing means, not shown, in a direction away from the spindle 103 by biasing means, not shown.

On the disc supporting surface 101a of the disc table 101 is mounted a magnet 102, such as a annular rubber magnet, for surrounding the disc supporting surface 101a. The magnet 102 is mounted on the disc table 101 at a level lower than the height level of the disc supporting surface 101a.

The lower surface of the base 151 carries an electronic circuit board 158 on which are mounted a variety of electronic circuits and detection switches. On the lower surface of the base 151 is mounted a lower cover 162 for covering the lower surface of the electronic circuit board 158.

On the upper surface of the base 151 carrying the disc table 101 is mounted a cartridge holder 159 for holding the disc cartridge for loading a magnetic disc in the disc cartridge on the disc table 101. The cartridge holder 159 holds the disc cartridge introduced from the front surface side of the disc drive device to move it to the lower side towards the base 151 to load the disc cartridge held therein on the disc table 101. This cartridge holder 159 is shaped as a thin casing having its front and bottom sides opened and is sized to hold the disc cartridge inserted at the front side of the disc drive device.

On the upper side of the base 151 is provided an uplifting/lowering plate 160, arranged between the base 151 and the cartridge holder 159, for uplifting/lowering the cartridge holder 159 towards and away from the disc rotation unit 110 provided on the base 151. On the uplifting/lowering plate 160 are set upright cams 160a, 160b having inclined surfaces on facing lateral sides. On the cam plates 160a, 160b are set supporting pins 159a on both sides of the cartridge holder 159. When the uplifting/lowering plate 160 is in a state of having been moved in the direction indicated by arrow X1 in FIG. 7 towards the back side of the base 151, the cartridge holder 159 is maintained at an upper position spaced from the disc table 101 by a supporting pin 159a being supported on the upper surfaces of the cam plates 160a, 160b. At this time, the disc cartridge held by the cartridge holder 159 is ejected or the disc cartridge can be inserted into the cartridge holder 159. If the uplifting/lowering plate 160 is moved towards the front side of the base 151 in the direction indicated by arrow X2 in FIG. 7, the supporting pin 159a is moved along the inclined surfaces of the cam plates 160a, 160b so that the cartridge holder 159 is lowered onto the disc table 101 on the side of the base 151 in the direction indicated by arrow J in FIG. 7 in order to load the disc cartridge held by the cartridge holder 159 in position in the cartridge loading unit provided on the base 151 and in order to load the magnetic disc held in the disc cartridge on the disc table 101.

The uplifting/lowering plate 160 is biased into movement in the direction indicated by arrow X2 in FIG. 7 by biasing means, not shown. On the rear side of the base 151 is mounted a lock lever 169 for locking the uplifting/lowering plate 160 in the rearwardly moved position when the uplifting/lowering plate 160 is moved towards rear in the direction indicated by arrow X1 in FIG. 7.

On the front end face of the base 151 is mounted a front surface panel 164 having a cartridge inserting/detachment opening 165 via which to insert or detach the disc cartridge. The front surface panel 164 is formed with an opening for ejection button 167a for projecting an ejection button 166 towards the front surface side and an opening for display light 167b in which is disposed a display light 168. When the ejection button 166 is thrust from the front side of the front surface panel 164, a movement actuating plate 161 is moved in the direction indicated by arrow X1 in FIG. 7 for moving the uplifting/lowering plate 160 in the same direction indicated by arrow X1 in FIG. 7 for locking the uplifting/lowering plate 160 by a lock lever 169.

On the base 151 rearwardly of the disc drive device 150 are arranged a pair of head arms 163, 163, making up the magnetic head device. On the distal ends of these head arms 163, 163 are mounted a pair of facing magnetic heads 191, 191. On these head arms 163, 163 are mounted a pair of facing magnetic heads 191, 191. These head arms 163, 163 are rotationally biased by biasing means, not shown, in the direction of approaching the distal ends thereof, as indicated by arrow I in FIG. 7. These head arms 163, 163 are moved in the fore-and-aft direction of the base 151 in the direction indicated by arrow J in FIG. 7 corresponding to the radial direction of the magnetic disc mounted on the disc table 101.

The disc cartridge is introduced via the cartridge inserting/detachment opening 165 formed in the front surface panel 164 so as to be held by the cartridge holder 159. At this time, a shutter mounted on the disc cartridge is moved to open a recording and/or reproducing aperture formed in each of the upper and lower surfaces of the disc cartridge. By these apertures, the magnetic head 191, 191 mounted on the distal ends of the head arms 163, 163 are intruded into the main cartridge body unit so that the magnetic disc held in the main cartridge body unit is clinched between these magnetic heads 191, 191.

When the disc cartridge is inserted into the cartridge holder 159, the lock lever 169 is thrust by the disc cartridge to unlock the uplifting/lowering plate 160 from the lock lever 169. The uplifting/lowering plate 160, unlocked from the lock lever 169, is moved in the direction indicated by arrow X2 in FIG. 7, that is towards the front side of the disc drive device 150, under the bias of the biasing member. By movement of the uplifting/lowering plate 160 in the direction indicated by arrow X2 in FIG. 7, the cartridge holder 159 is lowered in the direction indicated by arrow J in FIG. 7. If the cartridge holder 159 is lowered in the direction indicated by arrow J in FIG. 7, the disc cartridge held by the cartridge holder 159 is supported by a positioning pin, not shown, provided on the cartridge loading unit provided on the base 151, so that the disc cartridge is loaded in position on the cartridge loading unit.

On the electronic circuit board 158, arranged on the lower surface of the base 151, there are provided a disc-in detection switch 178 for detecting the possible presence of the disc cartridge, and a write protection detection switch 179 for detecting the state of a write protection discriminating hole 179 for detecting the state of the discriminating hole provided in the disc cartridge. The disc cartridge is thrust by the disc cartridge, when loading the disc cartridge on the cartridge loading unit, for detecting that the disc cartridge has been loaded on the cartridge loading unit. When the disc cartridge is loaded on the cartridge loading unit, the write protection discriminating hole 179 detects the possible presence of the write protection discriminating hole to judge whether or not information signals can be recorded on the magnetic disc housed in the disc cartridge.

The electronic circuit board 158 also is provided with disc capacity detection switches 180a, 180b for detecting disc capacity discriminating holes provided in the disc cartridge, as shown in FIG. 7. These detection switches 180a, 180b are provided in register with disc capacity discriminating holes provided in the disc cartridge loaded on the cartridge loading unit. By detecting the position and possible presence of the disc capacity discriminating holes in the disc cartridge loaded on the cartridge loading unit, it is possible to detect the capacity of the magnetic disc housed in the disc cartridge.

When the disc cartridge is loaded on the cartridge loading unit, the magnetic disc housed in the disc cartridge has its hub attracted by the magnet 102 provided on the disc table 101 so that the disc is set on the disc table 101. At this time, the spindle 103 is introduced into the spindle passage opening formed in the hub. The chuck pin 104 is inserted in a chuck pin insertion hole 2d after the disc table 101 is set into rotation.

A large-capacity magnetic disc, as a disc-shaped recording medium of the present invention loaded on the above-described disc drive device, and the disc cartridge holding therein this magnetic disc, are hereinafter explained.

Figure 8:
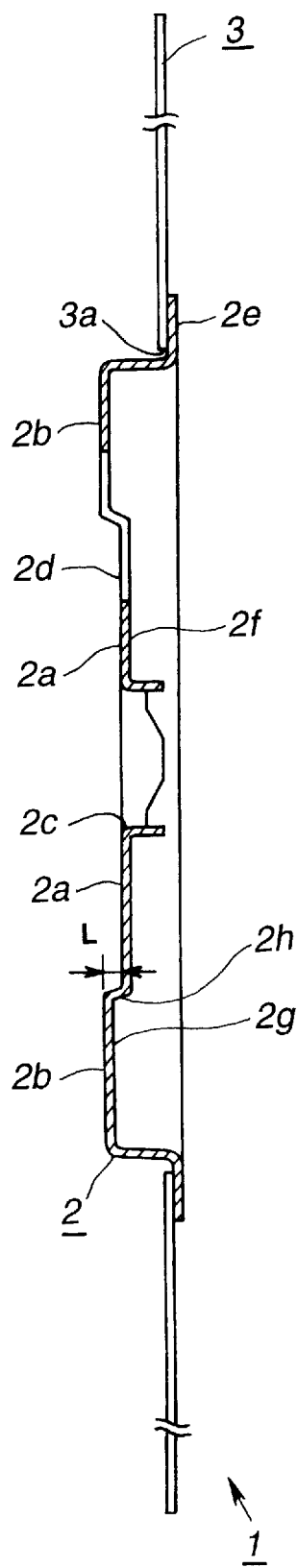
FIG. 8 a cross-sectional view showing a magnetic disc according to the present invention.

The large-capacity magnetic disc 1 according to the present invention has a disc substrate 3, formed of a film of flexible synthetic resin, as is the conventional magnetic disc, as shown in FIG. 8. On both major surfaces of the disc substrate 3 are deposited magnetic media to provide signal recording surfaces. The disc substrate 3 is formed in a circular shape having the diameter of 3.5 inch. The center portion of the disc substrate 3 is formed with a circular center opening 3a and a hub 2 is mounted for closing the opening 3a. The hub 2 is mounted on the disc substrate 3 so as to be engaged in the center opening 3a with a flange portion 2e provided on the outer rim of the proximal side thereof being coupled to the rim of the center opening 3a.

Figure 9:
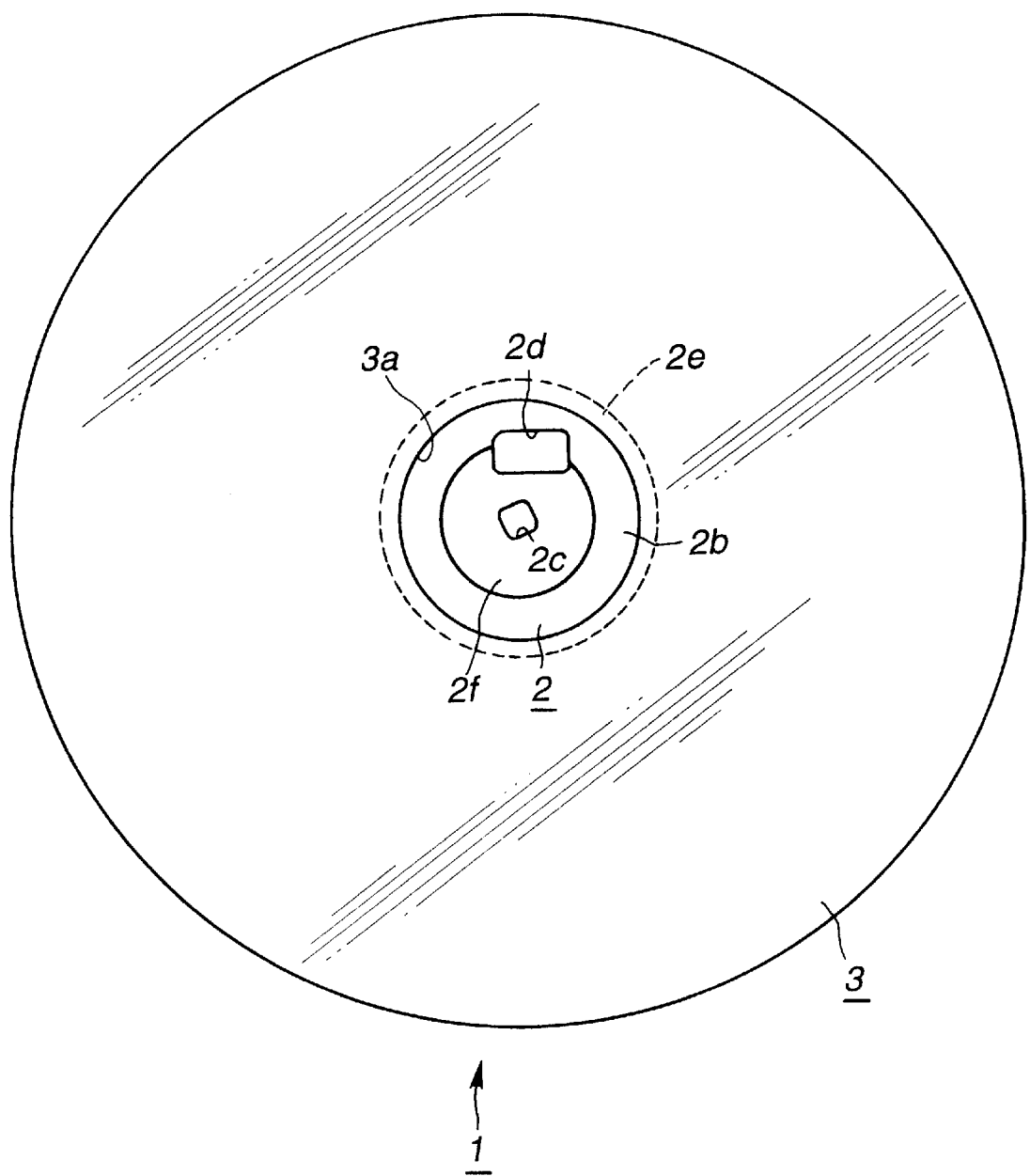
FIG. 9 is a plan view of a magnetic disc according to the present invention.

The hub 2 mounted on the disc substrate 3 has an inner rim portion 2f, having a circular profile, an outer rim portion 2g, similarly having a circular profile and which is formed on the outer rim side of the inner rim portion 2f, a connecting portion 2h interconnecting the inner rim portion 2f and the outer rim portion 2g, and the flange portion 2e formed on the outer rim portion of the outer rim portion 2g, as shown in FIGS. 8 and 9. The hub 2 is mounted on the disc substrate 3 by having the inner rim portion 2f and the outer rim portion 2g inserted into a center aperture 3a formed in the disc substrate 3 and by having the flange portion 2e retained by the rim of the center aperture 3a, with the retained portion being secured using an adhesive.

The outer rim portion 2g of the hub 2 is formed so as to be protruded from the major surface of the disc substrate 3 by a separation L from the inner rim portion 2f. The amount of protrusion of the outer rim portion 2g from the inner rim portion 2f is selected to be 0.25 mm, as an example.

The center portion of the hub 2 is formed with a spindle passage opening 2c passed through by a spindle 103 provided on the disc rotation unit 100 when the magnetic disc 1 carrying this hub 2 is loaded on the disc rotation unit 100. The hub 2 is also formed with a chuck pin insertion hole 2d at a position offset from the center position and which is spaced a pre-set separation from the spindle passage opening 2c. On the surface of the flange portion 2e facing the disc substrate 3 is bonded a ring-shaped double-sided adhesive sheet substantially coplanar with the flange portion 2e. The hub 2 is bonded to the disc substrate 3 using the double-sided adhesive sheet.

The outer surface of the inner rim portion 2f of the hub 2, which is protruded from the disc substrate 3, operates as a setting surface 2a on the hub supporting surface 101a provided on the disc table 101 of the disc rotation unit 100. The outer surface of the outer rim portion 2g protruded from the inner rim portion 2f operates as a suction surface 2b facing the magnet 102 provided on the disc table 101.

The inner rim portion 2f and the outer rim portion 2g make up a major surface of the hub 2.

The technique of increasing the capacity of the magnetic disc 1 is explained. For increasing the capacity of the magnetic disc 1 having the same size as the conventional magnetic disc, it is necessary to record information signals to high density. For high density recording of information signals, it is necessary to reduce the track pitch of the recording tracks. The track pitch cannot be reduced by performing tracking of the magnetic head for each recording track based on step feed of the stepping motor adapted for feeding the magnetic head.

Figure 10:
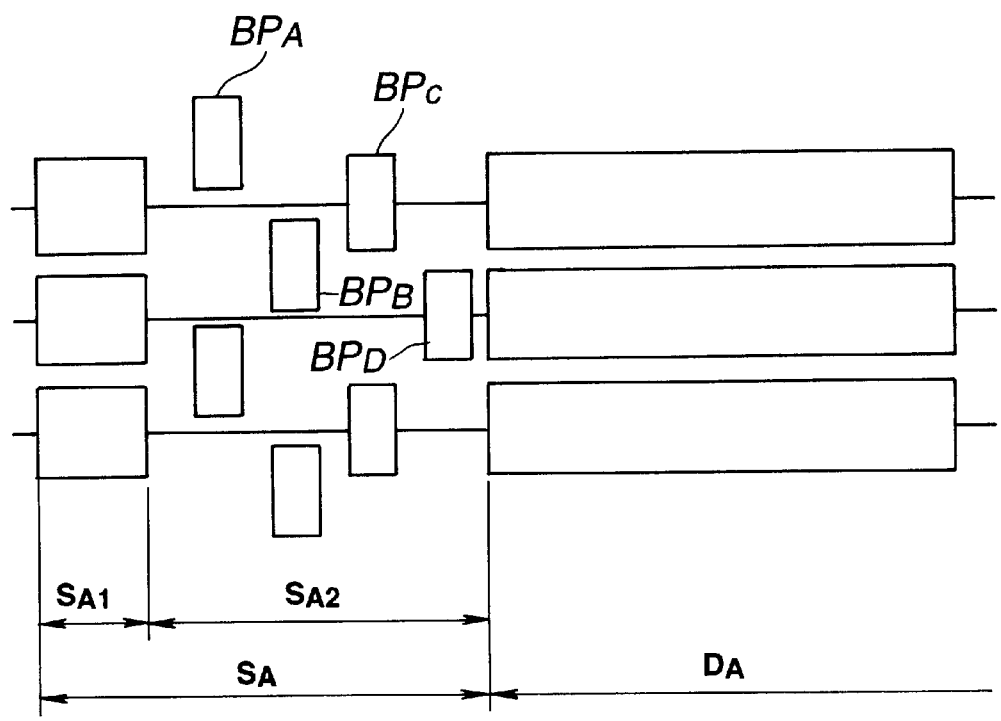
FIG. 10 is a schematic view showing the recording state of the servo information recorded on the magnetic disc according to the present invention.
Figure 11:
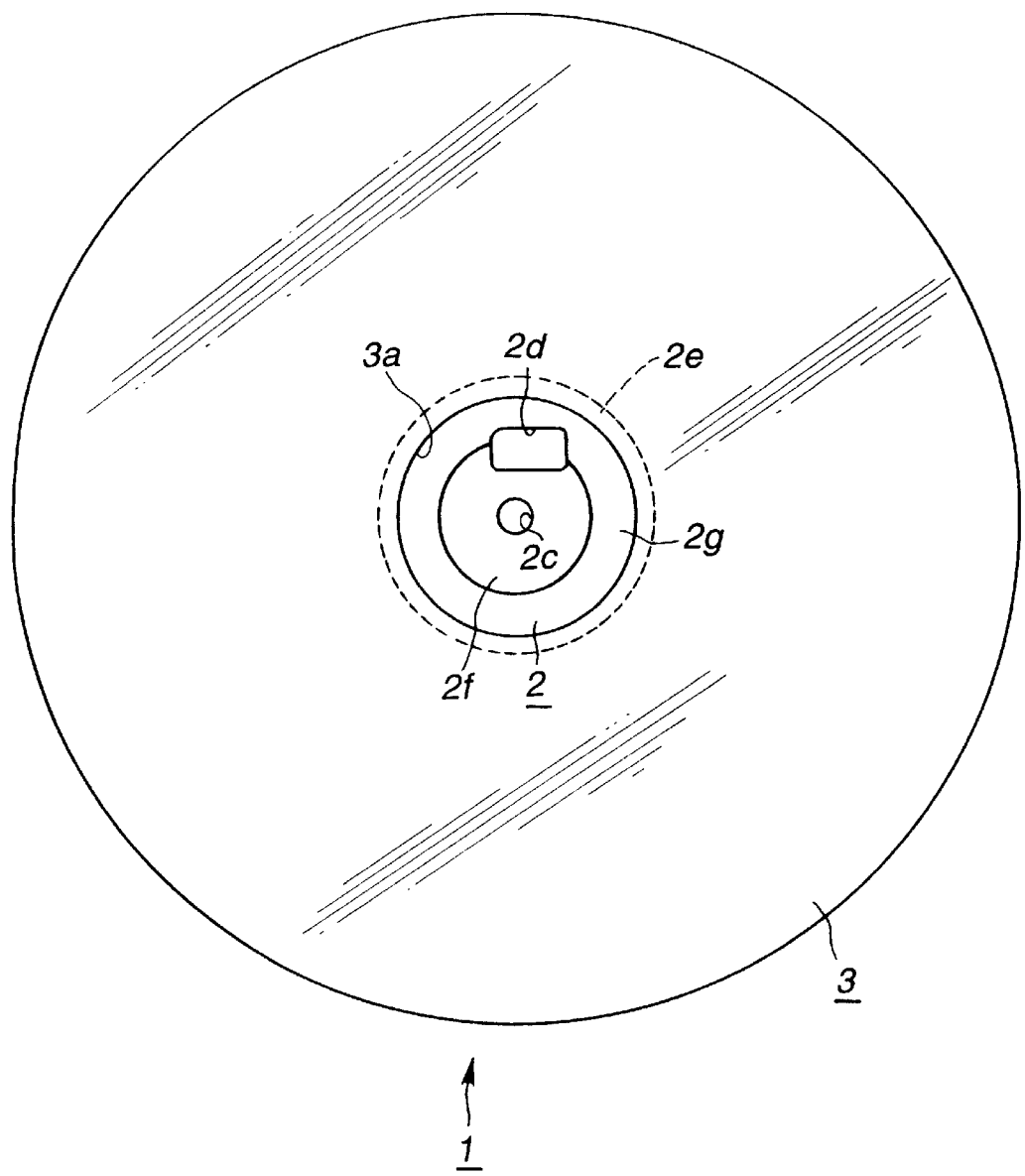
FIG. 11 is a plan view showing a disc cartridge housing a magnetic disc according to the present invention.

Thus, with the magnetic disc 1 having the increased capacity in accordance with the present invention, the servo information is previously recorded, as shown in FIG. 10, and tracking servo routinely practiced in hard disc drives, for example, is performed on the basis of the pre-recorded servo information, as shown in FIG. 10. The magnetic disc 1 of the present invention has a servo area SA and a data area DA, as shown in FIG. 10. The servo area SA is made up of an area SA1, having recorded therein an automatic gain control (AGC) signal, a servo timing mark (STM) signals and a grey code area, and an area SA2, having recorded therein burst patterns for tracking servo $BP_A$, $BP_B$, $BP_C$ and $BP_D$.

The AGC signals are used, in the disc drive device 150 configured as shown in FIG. 7, for controlling the AGC amplifier for signals reproduced by the magnetic head 191, 191. The servo timing marks (STM) are used for detecting the timing of the burst patterns.

The grey code area $G_A$ has the track numbers indicating the track positions recorded therein. The grey code area $G_A$ enables readout even under non-stable tracking servo or in the absence of tracking servo. This enables quick access to the target track.

The burst patterns $BP_A$, $BP_B$, $BP_C$ and $BP_D$ are recorded each with a sole frequency. The burst patterns $BP_A$, $BP_B$, $BP_C$ and $BP_D$ are recorded each with a width Tp (track pitch) along the center axis of the track. Tracking servo can be performed based on the reproduced results of these burst patterns $BP_A$, $BP_B$, $BP_C$ and $BP_D$.

With the above-mentioned magnetic disc 1 of the present invention, since the burst patterns $BP_A$, $BP_B$, $BP_C$ and $BP_D$ for tracking servo are previously recorded thereon, it is unnecessary to effect centering about the spindle by relative insertion between the chuck pin and the chuck pin insertion opening as in the case of the conventional magnetic disc. Therefore, since the centering about the spindle as in the conventional practice is not required in the magnetic disc of the present invention, there is no necessity of providing the chuck pin insertion hole 2d.

Since the high capacity type magnetic disc 1 according to the present invention can be loaded on the above-described disc drive device 150, also capable of using the above-mentioned conventional magnetic disc 200, there is provided the chuck pin insertion hole 2d for insertion by the chuck pin 104 for centering the conventional magnetic disc 200 in order to enable loading on the above-described disc drive device 150.

Although the spindle passage opening 2c of the magnetic disc 1 according to the present invention, adapted for passage by the spindle 103 of the disc drive device 150, is rectangular in shape, as in the conventional magnetic disc 200, the spindle passage opening 2c may be circular in shape in meeting with the columnar-shaped spindle 103. That is, since there is no necessity of press-fitting the spindle 103 at a pre-set position in the spindle passage opening 2c, the spindle passage opening 2c may also be circular in shape. By forming the circular spindle passage opening 2c, there is no necessity of taking into account the orientation of the spindle passage opening 2c relative to the chuck pin insertion hole 2d rectangular in shape, thus facilitating formation of the hub 2.

It is seen from above that, even with the conventional magnetic disc 200 in which centring by insertion of the chuck pin 104 in the chuck pin insertion hole 2d to bias the magnetic disc 1 towards the outer rim to thrust the spindle passage opening 2c against the spindle 103 of the disc table 101 is not used, the magnetic head can be tracked relative to each recording track by effecting tracking servo based on the servo information recorded on the magnetic disc 1.

The magnetic disc 1 according to the present invention is formed using the flexible disc substrate 3 as in the conventional magnetic disc 200 and hence is susceptible to damage. Therefore, similarly to the conventional magnetic disc 200, the magnetic disc 1 of the present invention is housed in the main cartridge body unit 13, constructed as the disc cartridge 10 and is loaded on the cartridge loading unit in the disc drive device 150 in a state in which the magnetic disc 1 is housed in the disc cartridge 10. The magnetic disc 1 housed in the disc cartridge is loaded on the disc table 101 of the disc rotation unit 100 in the state in which it is housed in the disc cartridge 10.

The disc cartridge 10, housing the magnetic disc 1 of the present invention therein, is explained with reference to FIGS. 12 to 14.

Figure 12:
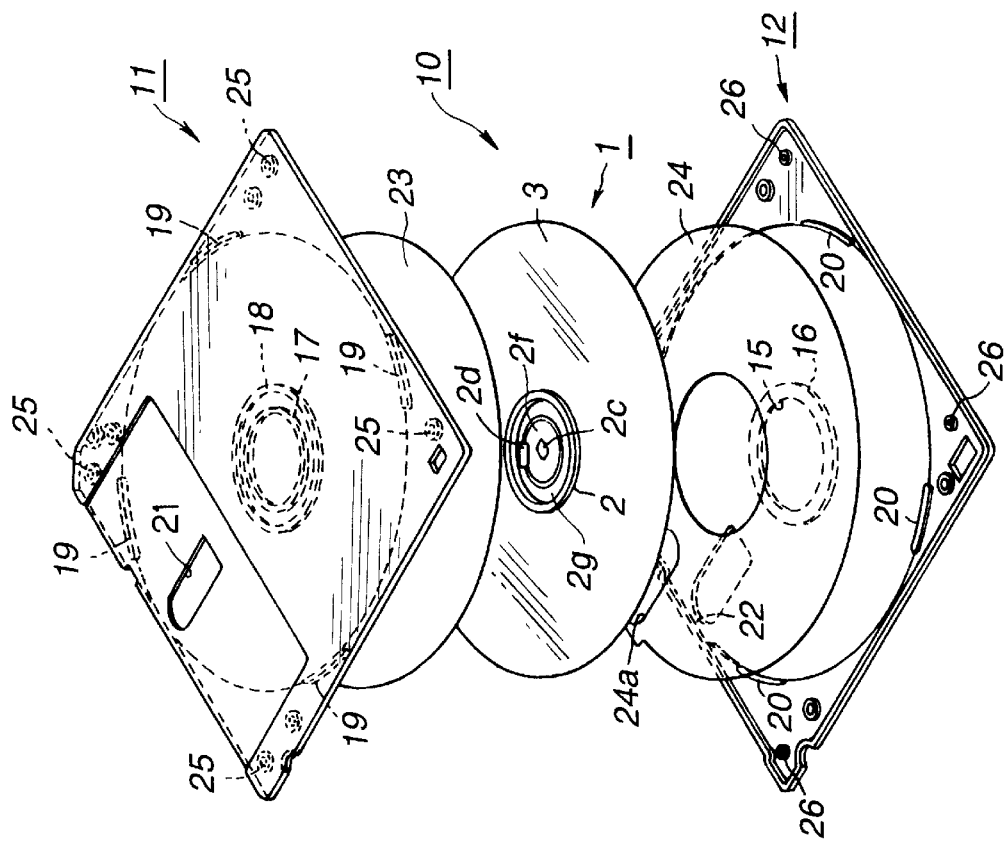
FIG. 12 is an exploded perspective view showing a disc cartridge housing a magnetic disc according to the present invention.
Figure 12:
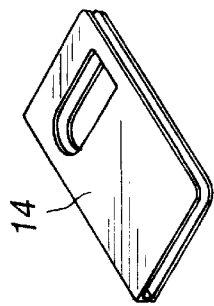

The disc cartridge 10 according to the present invention includes a main cartridge body unit 13, obtained on abutting together substantially rectangular upper and lower halves 11, 12, molded from a synthetic resin material, such as ABS resin, containing an anti-static material, as shown in FIG. 12. In this main cartridge body unit 13 is rotatably housed the magnetic disc 1. The upper and lower halves 11, 12 make up the main cartridge body unit 13 by abutting weld lugs 24, 25 and upstanding peripheral wall sections to each other to bond the abutting portions by ultrasonic welding to form the main cartridge body unit 13.

Figure 14:
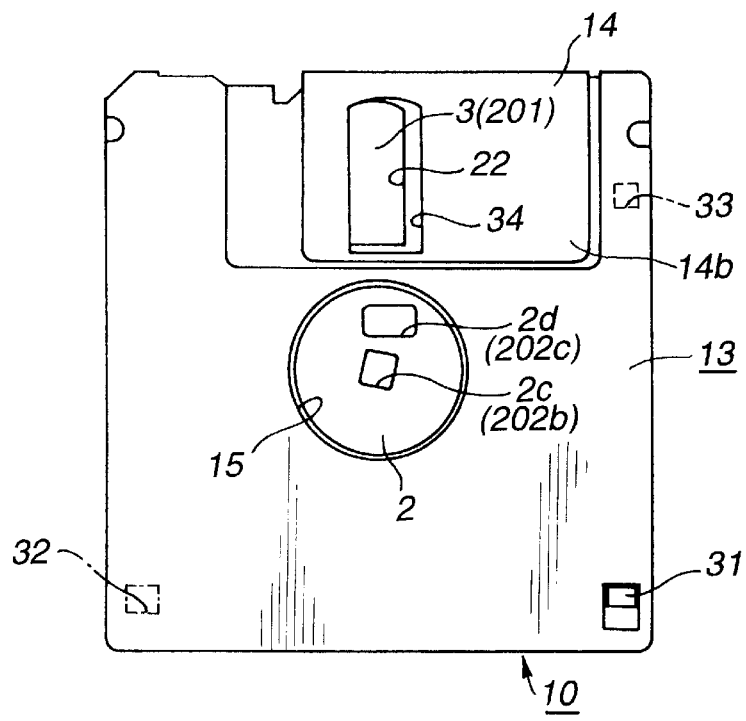
FIG. 14 is a bottom view of the bottom surface of the disc cartridge according to the present invention.

At a mid portion of the lower half 12 constituting the lower surface of the main cartridge body unit 13 is formed a circular center opening 15, as shown in FIG. 14. The rim of the inner surface of the center opening 15 is formed with a annular rib 16. The magnetic disc 1 is housed within the main cartridge body unit 13 by having its portion corresponding to the flange 2e of the hub 2 supported by the annular rib 16. When viewed from the side of the center opening 15 in the lower surface of the main cartridge body unit 13, the outer rim portion 2g of the hub 2 mounted on the magnetic disc 1 is protruded towards the lower surface of the main cartridge body unit 13 more prominently than the inner rim portion 2f.

The mid portion on the inner surface of the upper half 11 constituting the upper surface of the main cartridge body unit 13 is formed with an annular rib 17 engaged with the inner rim of the hub 2 mounted on the magnetic disc 1. The magnetic disc 1 housed in the main cartridge body unit 13 has its annular rib 17 engaged with the hub 2 so that the magnetic disc is housed in the main cartridge body unit 13 in a state in which it is limited in its movement in the direction parallel to the major surface. On the outer surface of the annular rib 17 is formed an annular rib 18 constituting a mounting portion for a protective sheet as later explained.

On the inner surfaces of the upper and lower halves 11, 12 are formed four arcuate-shaped ribs 19, 20 inscribing the upper and lower halves 11, 12. These ribs 19, 20 are abutted together to define a disc housing section. The magnetic disc 1 is housed in the main cartridge body unit 13 so as to be positioned in the disc housing section constituted by the ribs 19, 20.

Since the distance from the center of the center opening 15 of the lower half 12 to the ribs 19, 20 is slightly larger than the radius of the magnetic disc 1, the hub 2 is fitted with certain allowance in the center opening 15, so that, if the magnetic disc 1 is moved slightly in a direction parallel to its major surface, there is no risk of the rim of the magnetic disc 1 contacting with the ribs 19, 20.

The mid facing portions of the upper half 11 and the lower half 12 making up the main cartridge body unit 13 in the left-and-right direction are formed with rectangular apertures 21, 22 for a magnetic head. The apertures 21, 22 extend from the vicinity of the center portion to a lateral side of the main cartridge body unit 13. The magnetic disc 1 housed in the main cartridge body unit 13 has its recording surface exposed to outside across the inner and outer rims of the disc.

To the inner surface of the main cartridge body unit 13 are bonded substantially ring-shaped protective sheets 23, 24 formed by, for example, non-woven fabrics. These protective sheets 23, 24 serve for preventing the recording surface of the magnetic disc 1 from being damaged due to contact with the inner surface of the main cartridge body unit 13 formed of synthetic resin. The portions of the protective sheets 23, 24 in register with the apertures 21, 22 are formed with radially extending cut-outs 24a for not closing the apertures 21, 22.

Figure 13:
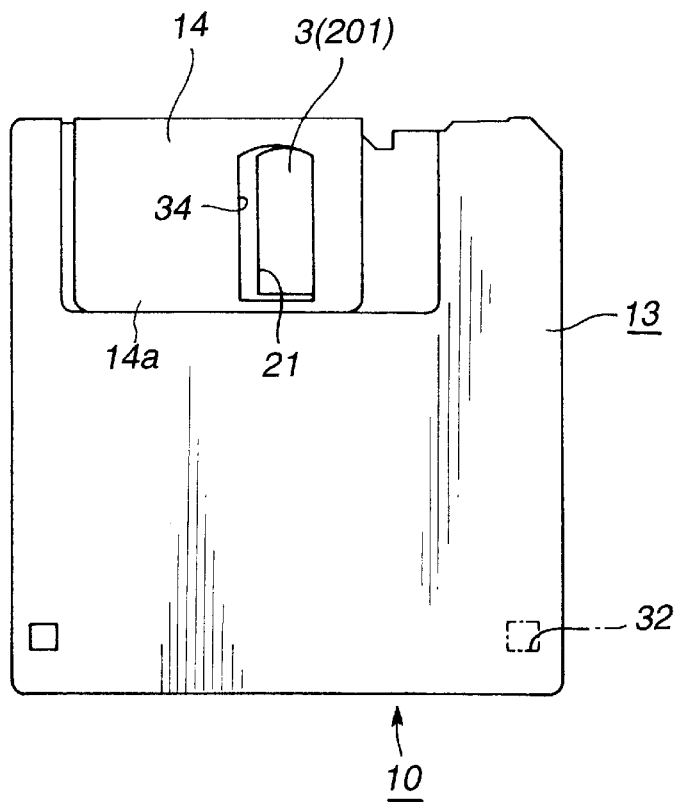
FIG. 13 is a plan view showing the upper surface of the disc cartridge according to the present invention.

Referring to FIGS. 13, 14, the main cartridge body unit 13 includes a mistaken recording inhibiting hole 31, operating as a discriminating hole specifying whether or not the information signals recorded on the magnetic disc 1 housed therein can be erased by overwriting or erasure, and a disc discriminating hole 32 specifying the type of the magnetic disc housed in the main cartridge body unit 13. Meanwhile, if it is the magnetic disc 1 of high recording capacity capable of recording information signals to a high recording density that is housed in the main cartridge body unit 13, there is also formed a disc discriminating hole 33 at a corner side having the apertures 21, 22 for the magnetic head 1 for indicating that the disc housed in the main cartridge body unit 13 is the high recording capacity type magnetic disc capable of recording information signals to high recording density. These disc discriminating holes 32, 33 make it possible to discriminate magnetic discs of different recording densities.

The disc cartridge 10 of the present invention mounts thereon a shutter member 14 for opening/closing the shutter 14 opening or closing the apertures 21, 22 for the magnetic head. The shutter member 14 is formed to a cross-sectional shape of the letter U from a metal sheet of aluminum or stainless steel or by molding synthetic resin. The shutter member 14 is fitted from one lateral surface of the main cartridge body unit 13 for overlying the apertures 21, 22 and is mounted thereon for movement in a direction of opening/closing the apertures 21, 22. The shutter portions 14a, 14b overlying the apertures 21, 22 of the shutter member 14 are provided with apertures 34 which are in register with the apertures 21, 22 when the shutter portions 14a, 14b are moved to the position of opening the apertures 21, 22.

The magnetic disc 1 of the present invention, rotatably housed in the disc cartridge 10 as described above, is inserted into the disc drive device 150 in the state in which the disc is accommodated in the disc cartridge 10, and is loaded on the disc table 101 of the disc rotation unit 100 in this housed state.

Figure 15:
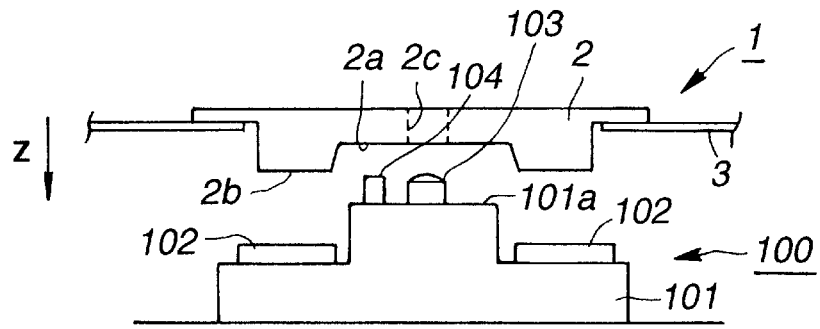
FIG. 15 is a side view showing the state in which the magnetic disc according to the present invention is mounted on a disc rotation unit of a disc drive device.

Next, the state of loading the magnetic disc on the disc table 101 of the disc rotation unit 100 is explained with reference to FIGS. 15 and 16.

Figure 16:
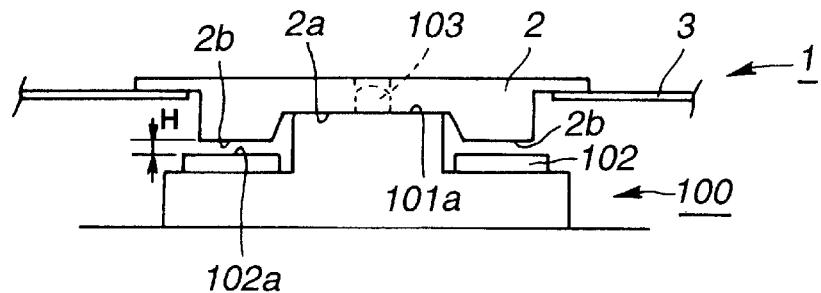
FIG. 16 is a side view showing the state in which the magnetic disc according to the present invention is loaded on the disc rotation unit of the disc drive device.
Figure 17:
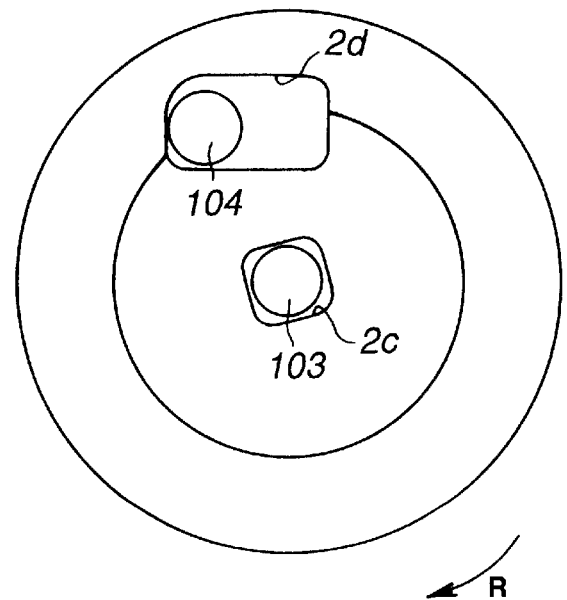
FIG. 17 is a plan view showing the initial state in which the magnetic disc according to the present invention is loaded on the disc rotation unit of the disc drive device.

In FIGS. 16 and 17, only the magnetic disc 1 is shown, while the main cartridge body unit 13 is omitted.

The magnetic disc is inserted in the state housed in the disc cartridge 10 into the disc drive device. The disc cartridge 10 inserted into the disc drive device is held by the cartridge holder 159. When the disc cartridge 10 is inserted, the cartridge holder 159 is lowered towards the disc rotation unit 100 and is set in position on the cartridge loading unit constituted on the base 151. As the disc cartridge 10 is loaded on the cartridge loading unit, the magnetic disc 1 housed in the disc cartridge 10 is lowered in the direction indicated by arrow Z in FIG. 15 towards the disc rotation unit 100 so as to be set on the disc table 101 constituting the disc rotation unit 100.

The distal end of the spindle 103, as the driving shaft of the spindle motor of the disc rotation unit 100, on which is loaded the magnetic disc 1, integrally carries a disc table 101. The upper surface of the disc table 101 has, on its surface, a disc supporting surface 101a on which to set the hub 2 of the magnetic disc 1. A chuck pin 104 is mounted on the disc table 101 at a position offset from the spindle 103. The chuck pin 104 is mounted for movement in a direction emerging from and receding into the disc supporting surface 101a and in a direction towards and away from the spindle 103. The chuck pin 104 is biased by biasing means, not shown, in a direction away from the spindle 103.

On the disc supporting surface 101a of the disc table 101 is mounted a magnet 102, such as an annular rubber magnet, for surrounding the disc supporting surface 101a. The magnet 102 is mounted on the disc table 101 at a level lower than the disc supporting surface 101a.

Referring to FIG. 16, the magnetic disc 1 has the setting surface 2a on the inner rim portion 2f of the hub 2 supported on the hub supporting surface 101a of the disc table 101 so that the suction surface 2b of the outer rim portion 2g formed with a step difference on the outer rim of the inner rim portion 2f faces the facing surface 102a of the magnet 102 with a pre-set distance H therebetween.

At this time, the spindle 103 is inserted into the spindle passage opening 2c of the hub 2, with the chuck hub 104 engaging in the hub engagement opening 2d, as shown in FIG. 17.

Figure 1:
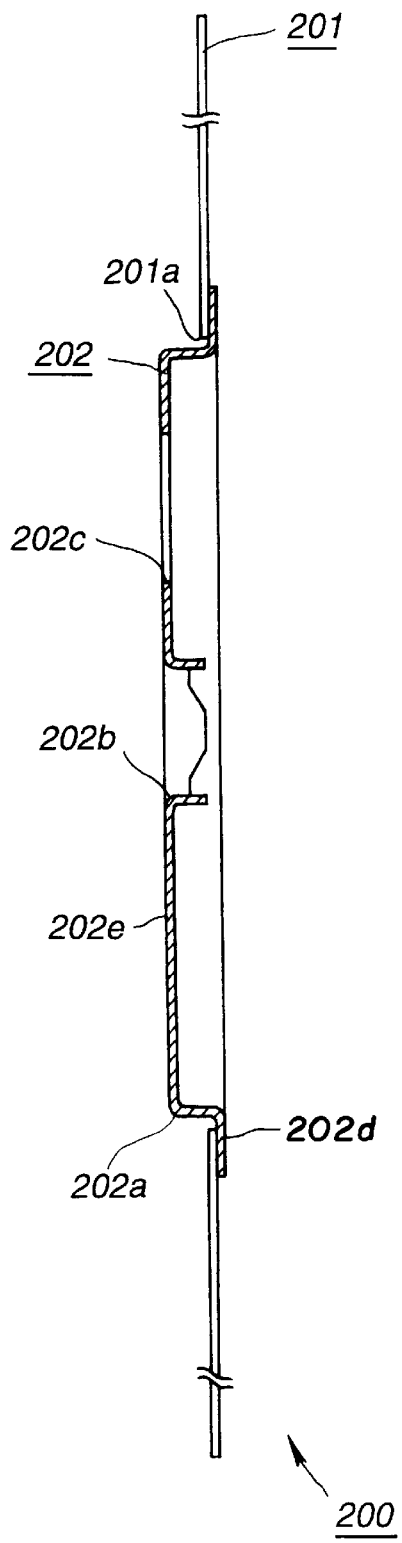
FIG. 1 is a cross-sectional view showing a conventional magnetic disc.
Figure 2:
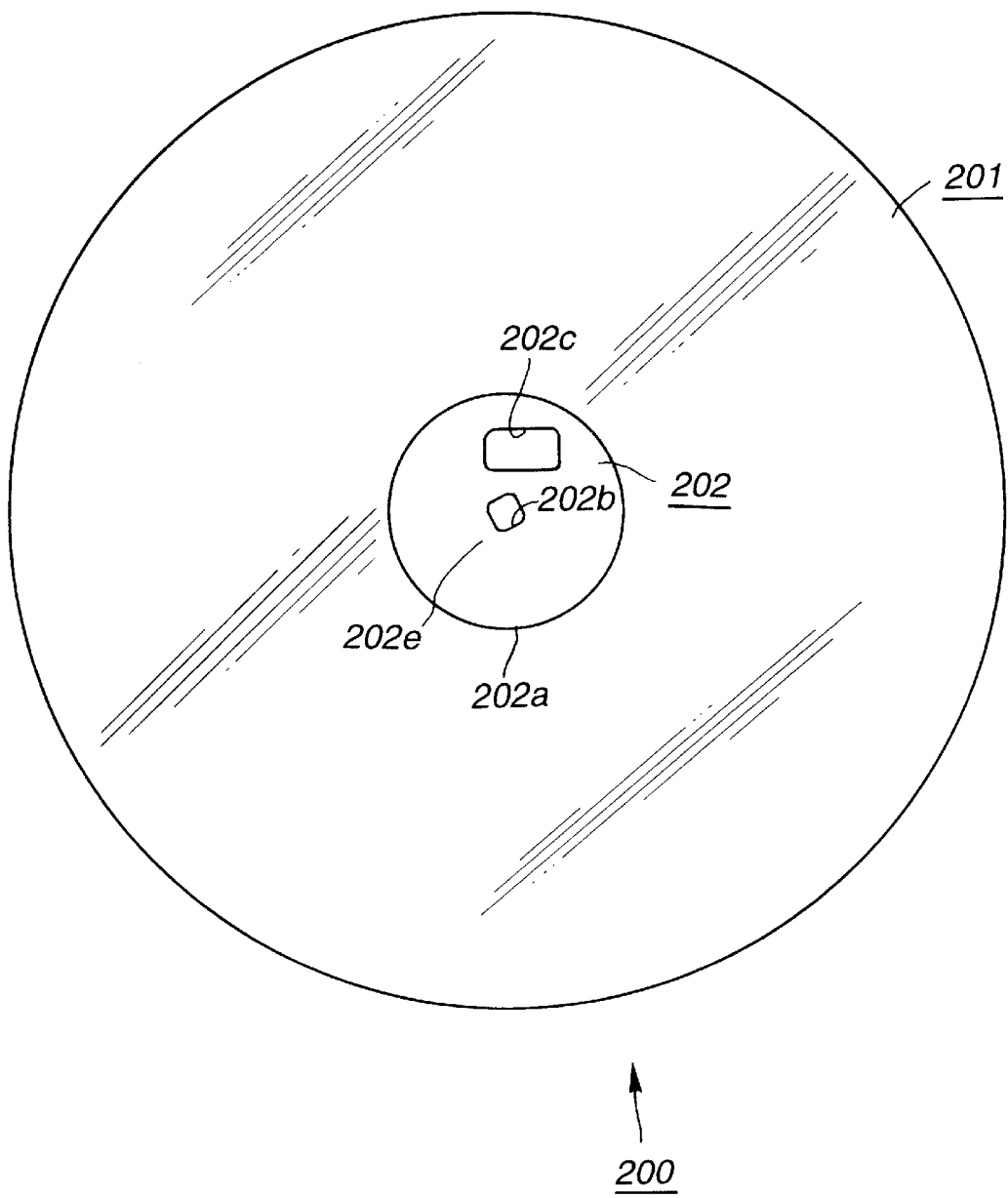
FIG. 2 is a bottom view of the magnetic disc shown in FIG. 1.
Figure 3:
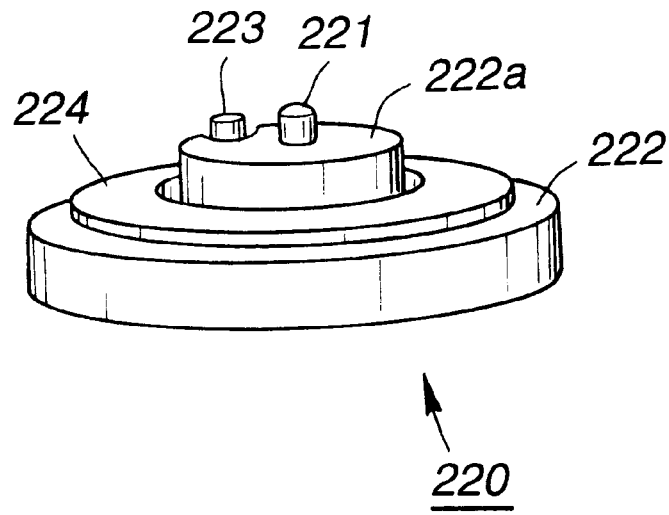
FIG. 3 is a perspective view showing a disc rotation unit on which a magnetic disc has been loaded and which is adapted for rotationally driving the magnetic disc.
Figure 4:
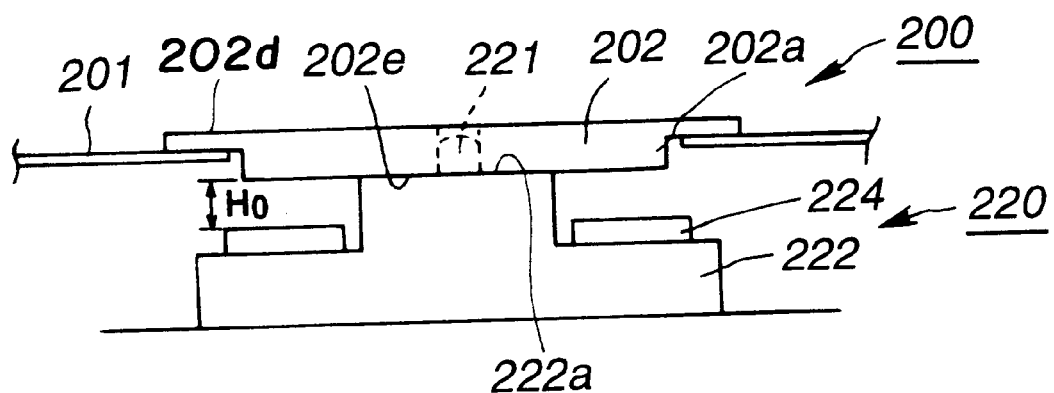
FIG. 4 is a side view showing the state in which the conventional magnetic disc has been loaded on the disc rotation unit.
Figure 5:
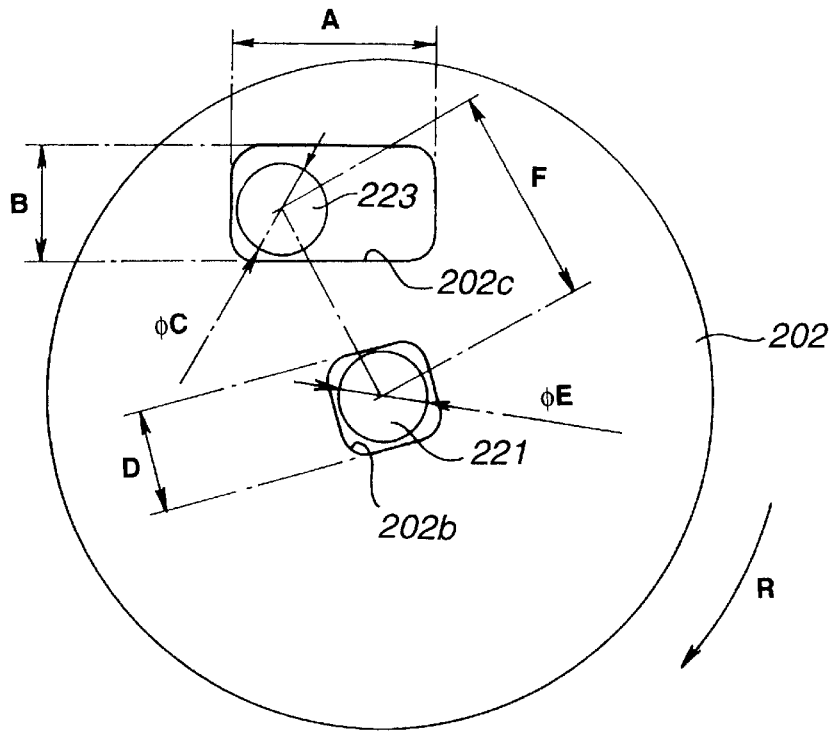
FIG. 5 is a plan view showing an initial stat in which the conventional magnetic disc is set on a disc table.
Figure 6:
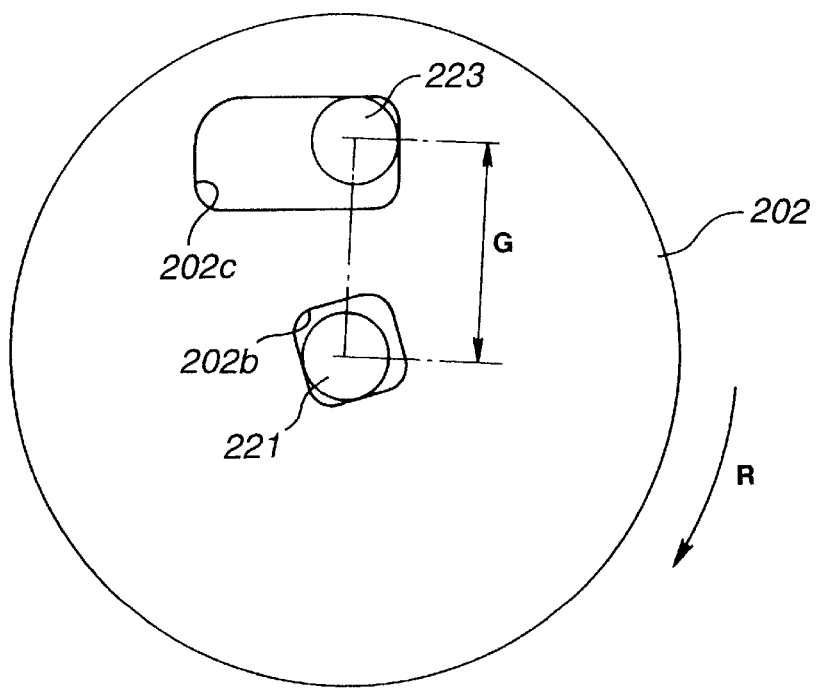
FIG. 6 is a plan view showing the conventional magnetic disc is centered and loaded on the disc table.

The hub 202 mounted on the conventional magnetic disc 200 is formed so that the setting surface 202e on the disc supporting surface 222a of the disc table 222 is flush with the outer rim surface of the disc supporting surface 222a facing the magnet 224, as shown in FIG. 1, so that, when the hub is set on the disc table 222, the separation $H_0$ between the surface of the hub facing the magnet 224 and the surface of the magnet 204 is approximately equal to the separation between the disc supporting surface 222a and the surface of the magnet 224.

On the other hand, in the magnetic disc 1 of the present invention, the suction surface 2b of the outer rim portion 2g of the hub 2 is protruded downwards a distance L from the hub supporting surface 101a of the inner rim portion 2f, the suction surface of the hub approaches to the facing surface 102a of the magnet 102 a distance L corresponding to this distance of downward protrusion, so that the force of suction by the magnet 102 becomes larger than with the conventional magnetic disc 200, thus increasing the holding force of the magnetic disc 1 to the disc table 101.

The magnetic disc 1 loaded on the disc table 101 is rotated at a higher speed than the conventional magnetic disc 200. However, the force of suction of the magnet 102 is sufficiently larger than that with the conventional magnetic disc 200, so that high speed rotation does not lead to relative position shift between the magnetic disc and the disc table 101. Since the force of suction to the disc table 101 can be increased by using the hub 2 used in the magnetic disc 1 of the present invention on the conventional magnetic disc 200, the magnetic disc 200 can be centered more reliably with respect to the disc table 101.

The magnetic disc 1 of the present invention can have a large capacity of 200 MB. The magnetic disc 1 of the present invention also can have a recording capacity of 2 MB which is the same as that of the conventional magnetic disc 200. If the recording capacity is 200 MB, the optical disc 1 of the present invention is rotated at approximately an rpm of 3600 for recording and/or reproducing information signals for the conventional magnetic disc 200. If the recording capacity is 2 MB, the optical disc is rotated at an rpm of 300 as in the case of recording and/or reproducing information signals for the conventional magnetic disc 200.

The above-described disc drive device 150, enabling the magnetic disc 1 according to the present invention and the conventional magnetic disc 200 to be used selectively, is configured for executing tracking servo based on the above-mentioned servo information pre-recorded on the magnetic disc 1. That is, if the magnetic disc 1 of the present invention is loaded on the disc drive device 150, tracking servo is executed based on the servo information recorded on the magnetic disc 1. If it is the conventional magnetic disc 200 that has been loaded on the disc drive device 150, the disc is centered by the chuck pin 104 inserted in the chuck pin insertion opening 202c in order to record and/or reproduce information signals by an operation similar to that performed on the conventional disc drive device. That is, as the disc table 101 is rotated in the direction indicated by arrow R in FIG. 17, the chuck pin 104 compresses against the chuck pin insertion opening 202c in the hub 202 by the difference in the rotational speed of the disc table 101 and that of the magnetic disc 200 to center the magnetic disc 200 with respect to the spindle 103.

The relation between the amount of protrusion of the suction surface 2b of the outer rim portion 2g of the hub 2 from the setting surface 2a on the disc table 101 is explained with reference to FIGS. 18 and 19.

Figure 18:
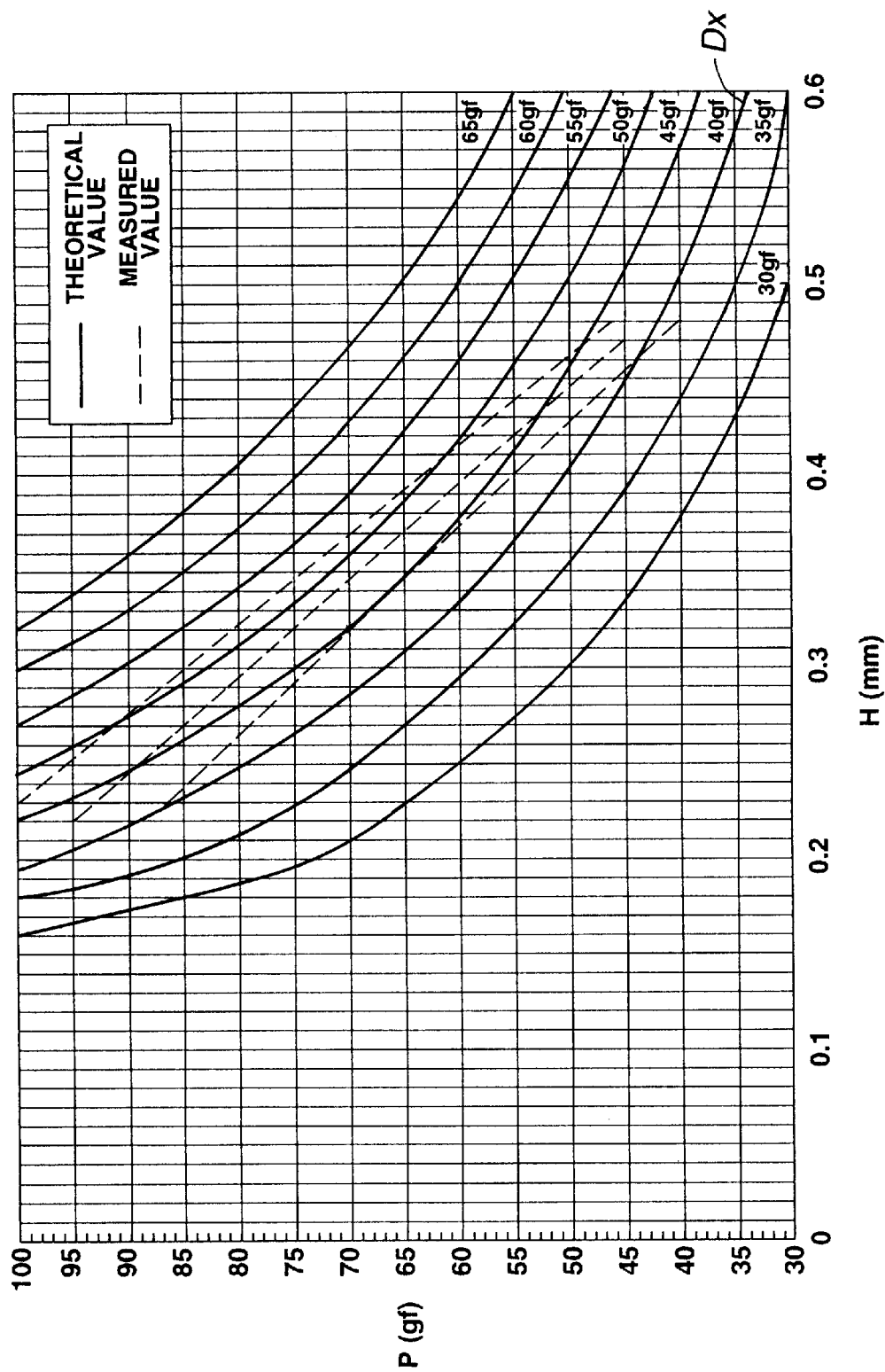
FIG. 18 is a graph showing the relation between the distance between a magnet and the hub attracted by this magnet and the force of suction of the hub by the magnet.

In FIG. 18, the abscissa denotes the separation H between the suction surface 2b of the outer rim portion 2g of the hub 2 and the facing surface 102a of the magnet 102 provided on the disc table 101, while the ordinate denotes the force of suction P (gf) by the magnet 102. In FIG. 18, the experimental values and the theoretical values of the above variables are shown by solid and broken lines, respectively. In FIG. 19, the magnetic disc 1 of the present invention is shown set on the disc table 101 with the suction surface by the magnet 102 protruded from the setting surface 2a by a distance equal to the amount of protrusion L.

Figure 19:
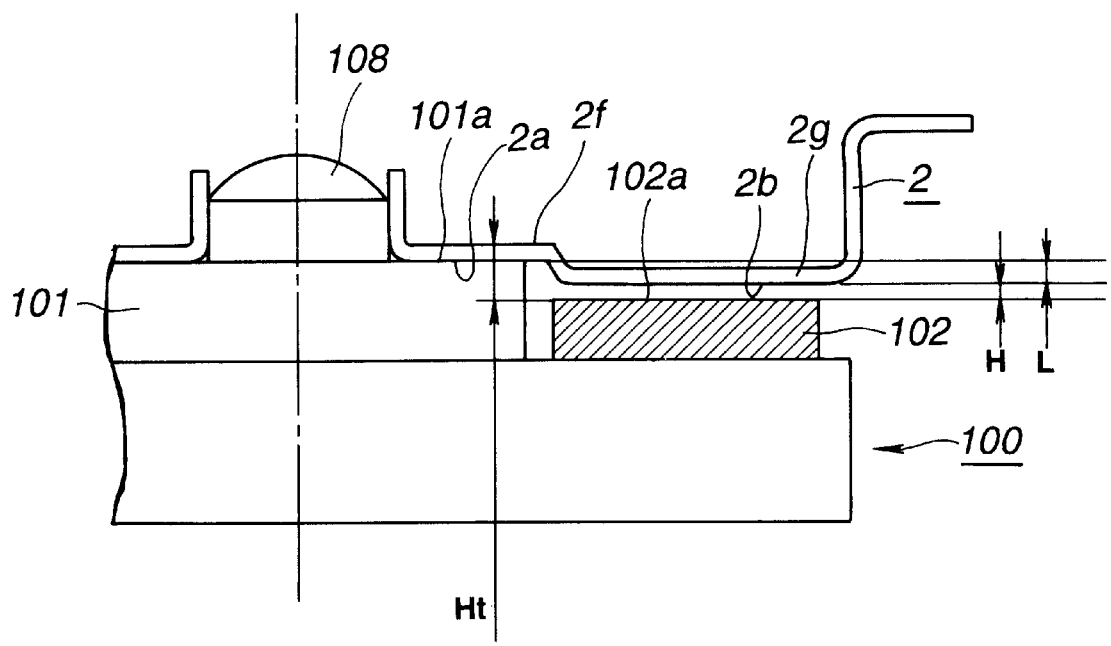
FIG. 19 is a side view showing the relation in which the magnetic disc according to the present invention is loaded on the disc rotation unit, with the amount of protrusion of the suction surface on the outer rim of the hub from the setting surface on the disc table being 0.25 mm.

In the results shown in FIG. 18, the separation $H_t$ between the facing surface 102a of the magnet 102 to the hub 2 and the supporting surface 2a of the inner rim portion 2g of the hub 2 is set to 0.5 mm, as shown in FIG. 19. In FIG. 18, there is shown the relation between the force of suction P by the magnet 102 and the separation H between the facing surface 102a of the magnet 102 and the suction surface 2b of the hub 2 for the magnitudes of the force of suction P of the hub by the magnet 102 of 30, 35, 40, 45, 50, 55 and 60 gf obtained for the case in which the separation H between the facing surface 102a of the magnet 102 to the hub 2 and the suction surface 2b of the outer rim portion 2g of the hub 2 is 0.5 mm, that is in case the supporting surface on the disc table and the suction surface of the hub are planar surfaces flush with each other.

It is seen from the results of FIG. 18 that the force of suction P by the magnet 102 is increased by decreasing the separation H between the facing surface 102a of the magnet 102 and the suction surface 2b of the hub 2 because the separation H is inversely proportionate to the force of suction P of the magnet (P=k/(1/H)), where k is a constant.

The theoretical values (calculated results) Dx for the force of suction P of the hub 2 by the magnet 102 of 40 gf, with the separation H between the facing surface 102a of the magnet 102 and the suction surface 2b of the hub 2 being 0.5 mm, are referred to in the following explanation. The reason these theoretical values Dx are used is that, in the hub of the conventional magnetic disc, the suction surface of the hub by the magnet and the supporting surface of the hub on the disc table are flush with each other, that is, the amount of protrusion L of the suction surface 2b of the outer rim portion 2g of the hub 2 of the magnetic disc 1 of the present invention from the setting surface 2a on the disc table 101 is 0, with the force of suction by the magnet 102 being approximately 40 gf.

In the magnetic disc 1 according to the present invention, the force of suction of the hub 2 by the magnet 2 is required to be not smaller than 55 gf, for which the magnitude of 5 G is assured as the impact properties at the time of mounting on the disc table 101.

It is seen from this that, with the calculated results Dx in which the force of suction P of the hub 2 by the magnet 102 is equal to 40 gf for the separation H between the facing surface 102a of the magnet 102 and the suction surface 2b of the hub 2 equal to 0.5 mm, the force of suction not smaller than 55 gf required with the magnetic disc 1 of the present invention can be obtained if the above separation H is smaller than 0.36 mm. Therefore, the distance H of 0.25 mm between the facing surface 102a of the magnet 102 and the suction surface 2b of the hub 2 is set, while the amount of protrusion L of the suction surface 2b of the outer rim portion 2g of the hub 2 from the setting surface 2a on the disc table 101 is set to 0.5 mm–0.25 mm=0.25 mm. It may be seen from the experimental results (broken lines) of FIG. 18 that the force of suction P of the hub 2 by the magnet 102 not less than 55 gf can be realized when the separation H between the facing surface 102a of the magnet 102 and the suction surface 2b of the hub 2 is set to 0.25 mm.

From the results of the force of suction P of the hub 2 by the magnet 102 shown in FIG. 18, the amount of protrusion L of the suction surface 2b of the outer rim portion 2g of the hub 2 from the setting surface 2a on the disc table 101 is preferably set to 0.25±0.1 mm and more preferably 0.25±0.025 mm in consideration of machining tolerances of the hub 2. In this case, the distance Ht from the facing surface 102a of the magnet 102 to the hub 2 to the supporting surface 101a of the disc table 101 is preferably set to 0.5±0.1 mm in view of machining tolerances. The force of suction of the hub 202 by the magnet 102 on loading the above-mentioned conventional magnetic disc 200 is 40±10 gf in view of the machining tolerances. These values are preferably taken into account in determining the amount of protrusion L of the suction surface 2b of the outer rim portion 2g of the hub 2 provided on the magnetic disc 1 of the present invention from the setting surface 2a on the disc table 101.

If the amount of protrusion L of the suction surface 2b of the outer rim portion 2g of the hub 2 from the setting surface 2a on the disc table 101 is set in this manner, the force of suction of the hub 202 by the magnet 102 on loading the conventional magnetic disc 200 equal to 40 gf can be assured, while the force of suction of the hub 202 by the magnet 102 on loading the magnetic disc 1 of the present invention on the disc table 101 equal to 55 gf or higher can similarly be assured.

What is claimed is:

1. A disc-shaped recording medium comprising:
   a disc substrate having a major surface as a recording surface and an approximately circular center opening; and
   a hub secured to said disc substrate and disposed in said center opening of said disc substrate, said hub including an inner rim portion having a center spindle opening for receiving a spindle of a driving device, an outer rim portion protruding from said inner rim portion by a step located towards a spindle insertion side of said hub, a major surface portion formed by said inner rim portion and said outer rim portion, and a chuck member insertion opening for receiving a chuck member of said driving device and positioned such that said chuck member insertion opening extends across said inner rim portion and said outer rim portion.

2. The disc-shaped recording medium according to claim 1, wherein tracking servo information is recorded on said recording surface of said disc substrate.

3. The disc-shaped recording medium according to claim 1, wherein said hub is formed of a magnetic material.

4. The disc-shaped recording medium according to claim 1, wherein said step of said hub has a height of approximately 0.25 mm.

5. The disc-shaped recording medium according to claim 1, wherein said recording surface is a magnetic signal recording surface.

6. A disc cartridge comprising:
   a main cartridge body unit including a pair of half portions, one of said half portions having a spindle opening for receiving a spindle of a driving device; and
   a disc-shaped recording medium rotatably housed within said main cartridge body unit,
   said disc-shaped recording medium comprising:
      a disc substrate having a major surface as a recording surface and an approximately circular center opening, and
      a hub secured to said disc substrate and disposed in said center opening of said disc substrate such that said hub faces outward from said spindle opening, said hub including an inner rim portion having a center spindle opening for receiving said spindle of said driving device, an outer rim portion protruding from said inner rim portion by a step located towards said spindle opening, a major surface portion formed by said inner rim portion and said outer rim portion, and a chuck member insertion opening for receiving a chuck member of said driving device and positioned such that said chuck member insertion opening extends across said inner rim portion and said outer rim portion.

7. The disc cartridge according to claim 6, wherein tracking servo information is recorded on said recording surface of said disc substrate.

8. The disc cartridge according to claim 6, wherein said hub is formed of a magnetic material.

9. The disc cartridge according to claim 6, wherein said step of said hub has a height of approximately 0.25 mm.

10. The disc cartridge according to claim 6, wherein said recording surface is a magnetic signal recording surface.

* * * * *